(12) United States Patent
Vos et al.

(10) Patent No.: US 6,959,234 B2
(45) Date of Patent: Oct. 25, 2005

(54) PROCESS FOR MONITORING THE CONDITION OF MOTOR VEHICLE WHEELS

(75) Inventors: Serge Vos, Munich (DE); Markus Wimmer, Bruckmuehl (DE); Wolfgang Zimprich, Ismaning (DE); Marcus Jautze, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 50 days.

(21) Appl. No.: 10/254,545

(22) Filed: Sep. 26, 2002

(65) Prior Publication Data
US 2003/0093240 A1 May 15, 2003

(30) Foreign Application Priority Data
Sep. 28, 2001 (DE) .......................... 101 48 093

(51) Int. Cl.$^7$ ................................. G06F 7/00
(52) U.S. Cl. .................. 701/29; 340/444; 702/146; 702/147
(58) Field of Search .................. 701/29; 340/442, 340/443, 444; 702/145, 146, 147, 148

(56) References Cited

U.S. PATENT DOCUMENTS 5,541,859 A * 7/1996 Inoue et al. ................ 702/148
6,014,599 A 1/2000 Inoue et al.
6,266,594 B1 * 7/2001 Ishikawa ..................... 701/50

FOREIGN PATENT DOCUMENTS

DE 4409846 9/1994
DE 19735313 2/1999

* cited by examiner

*Primary Examiner*—Gertrude A. Jeanglaude
(74) *Attorney, Agent, or Firm*—Crowell & Moring LLP

(57) ABSTRACT

A process and device for monitoring the state of a wheel of a motor vehicle in which an output signal of a sensor is converted into an essentially rectangular pulse signal. A respective duration of the pulse is measured; and an especially weighted average between the duration of a current value and a preceding value is determined, wherein a current value and a preceding value exhibit a time interval and/or lie a specific step size apart. A correction factor is determined from each deviation between the duration of a current value and a respective mean value. A step size of the correction method is matched to an error order of a fault. Preferably the step size with a periodic deviation of the m$^{th}$ order that is to be eliminated is determined according to the formula j=1/m×n/4; for motor vehicles in particular according to the formula j=1/m×12.

16 Claims, 4 Drawing Sheets

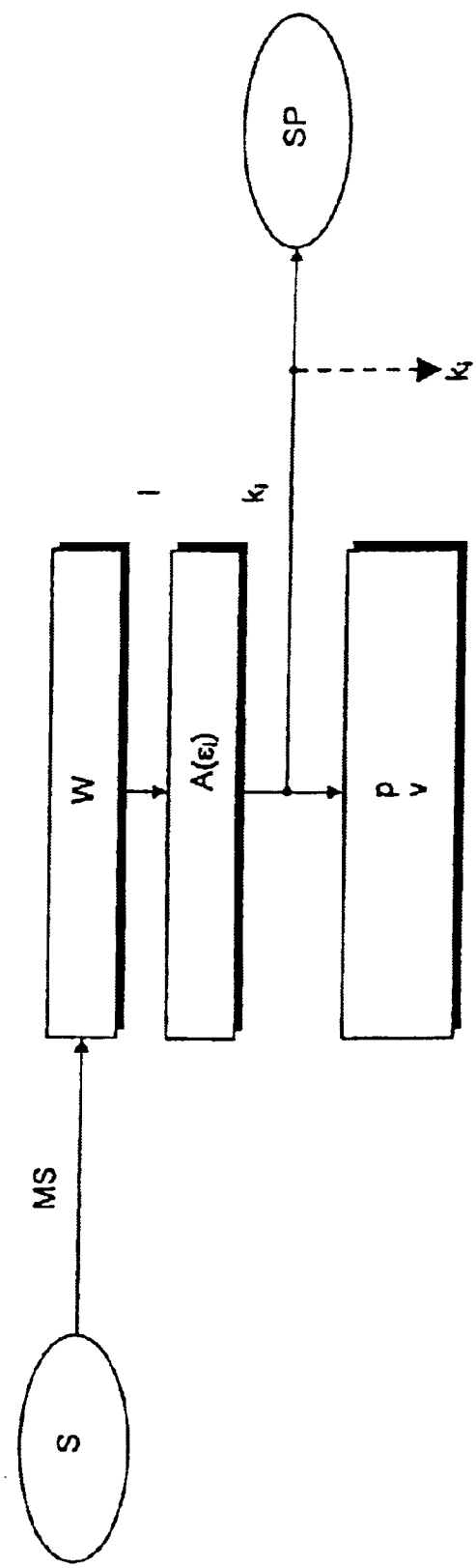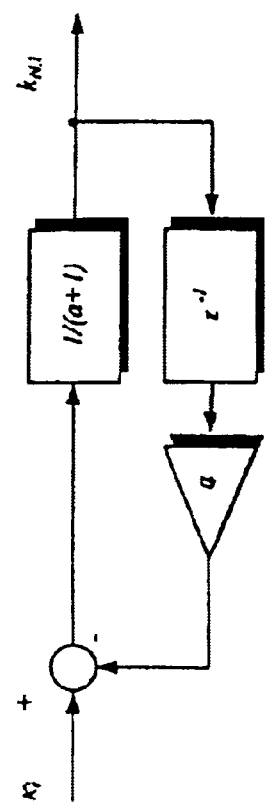

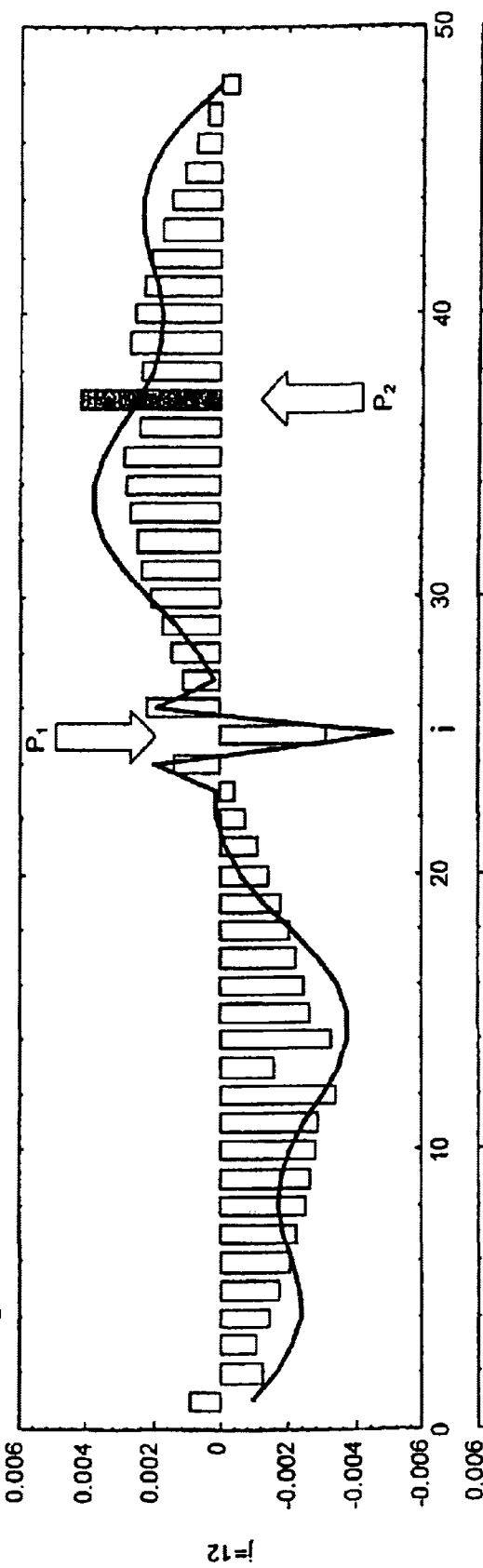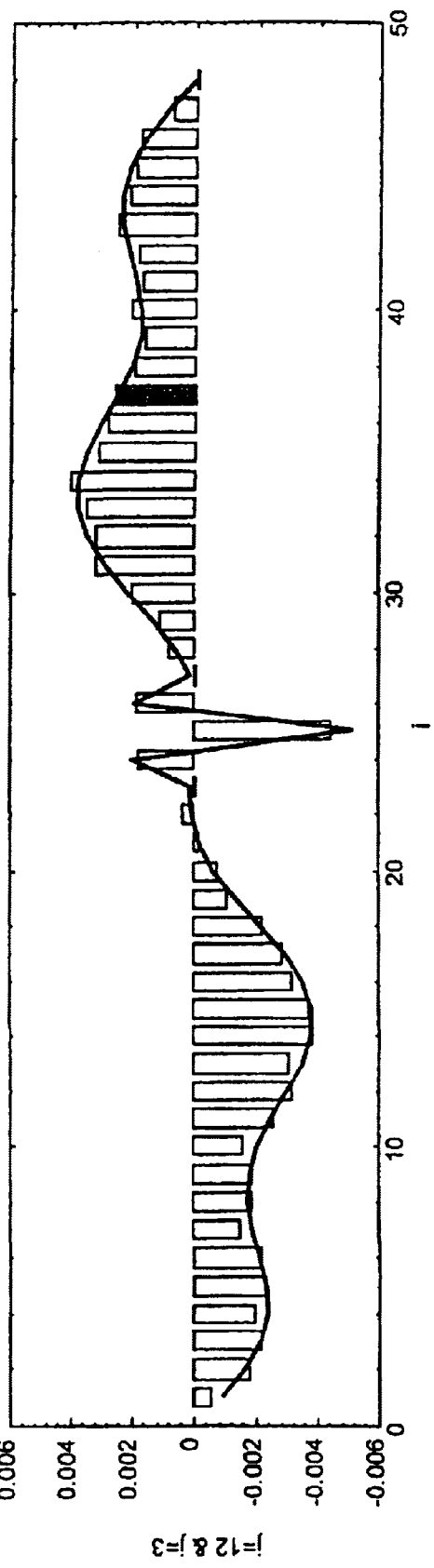
Fig. 4a
Fig. 4b

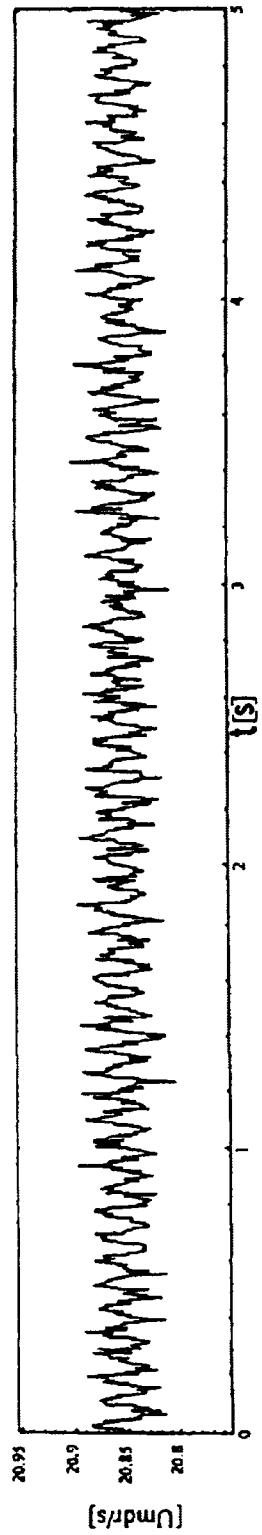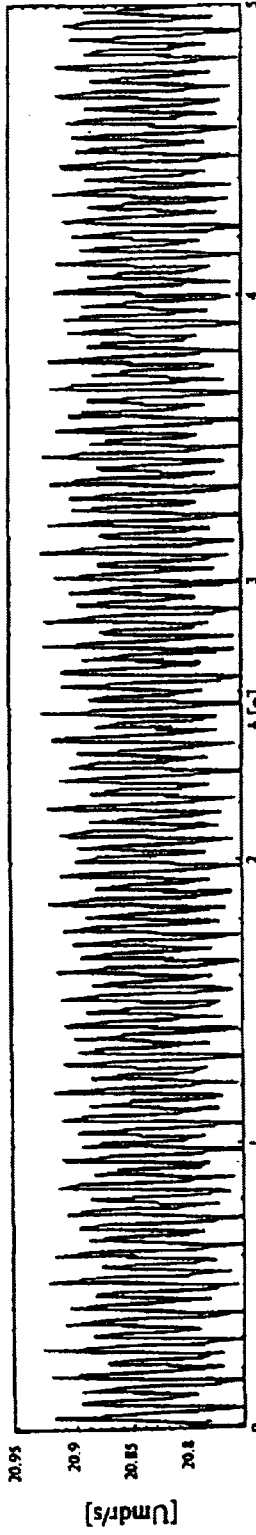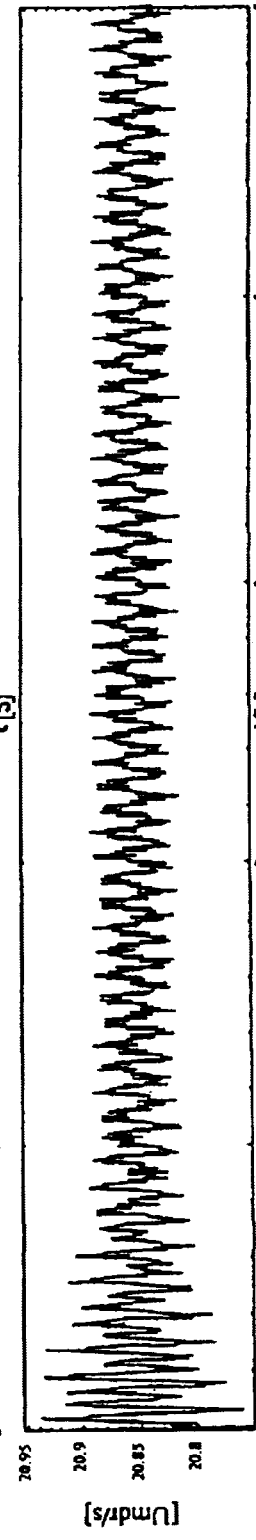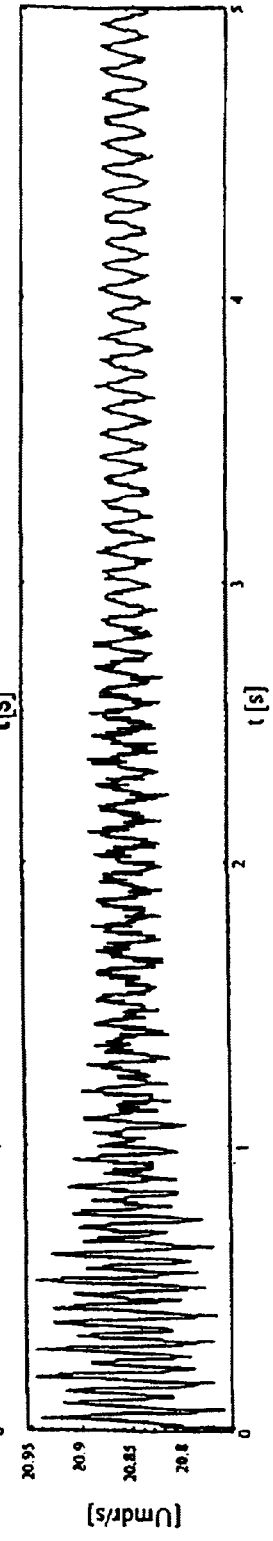

US 6,959,234 B2

PROCESS FOR MONITORING THE CONDITION OF MOTOR VEHICLE WHEELS

This application claims the priority of German Patent Document No. 101 48 093.8, filed Sep. 28, 2001, the disclosure of which is expressly incorporated by reference herein.

BACKGROUND AND SUMMARY OF THE INVENTION

The present invention relates to a process for monitoring the state of a wheel of a motor vehicle.

The key problem in monitoring the state of a wheel of a motor vehicle consists of determining the rotational speed. According to the prior art, a starting point for determining the rotational speed of a wheel of a motor vehicle is the use of the existing hardware from wheel slip control systems, such as an antilock system ABS, an anti-slip control with traction control ASC+T and others. In known systems, a sensor acts preferably inductively with a transducer wheel that is connected rigidly to the wheel. In automobiles the transducer wheel usually has 48 almost equidistant teeth for generating an electric output signal, which is evaluated as a measure of an instantaneous rotational speed of the wheel. By doing so, when there is a loss of pressure in the wheel, there is an increase in the rotational speed because of the decrease in the wheel diameter. To this end, the output signal of the sensor is converted into an essentially rectangular pulse signal. At the same time the respective duration of the individual pulses is measured.

In this respect the most accurate knowledge possible of the rotational speed of the motor vehicle wheel is less interesting for determining the speed of the motor vehicle itself than for monitoring the wheel tire. For example, modern tires have a limp home property, which permits driving up to a speed of approx. 80 km/h even with severe loss of pressure in the tire, without the vehicle driver having to be absolutely aware of a defective tire directly from the changed handling characteristics of the vehicle. However, beyond the specified threshold the vehicle is no longer operating safely. Thus, for safety reasons the driver must be cautioned by a monitoring system about a defect of a tire. For this and other reasons modern vehicles are increasingly equipped with tire control and tire pressure monitoring systems, whose function is based on the most accurate knowledge possible of the rotational speed of each of the four motor vehicle wheels or on the use of pressure sensors.

German Patent DE 197 35 313 A1 describes a process for determining the rotational speed used to evaluate a higher frequency content in the wheel speed signal for the purpose of identifying a loss of pressure in the tire. With this process, following the measurement of the duration of a pulse, an especially weighted average between a current value of the duration and a preceding value is determined. To measure the duration of the pulses of the speed sensor, the time between the two upward slopes of a rectangular signal is measured by means of a pulse width measurement, by counting the pulses of a clearly higher frequency signal, and is stored tentatively as the count of the counter $t_1$. The counts $t_1$ are read out at fixed times $T_1$ and made available to a further development environment. If within a computing cycle, several counts are measured, then a mean value is formed. Its reciprocal value is an absolute measure for the rotational speed of the wheel. The higher the count of the counter, the lower the rotational speed. In this manner the width of each tooth of the pulse wheel is measured by means of a high frequency pulsing oscillation crystal and is stored tentatively in a buffer. At equidistant times $T_1$, corresponding to a computing cycle of the processing algorithm, the buffer is read out and a mean value is formed from the counts that have arrived. Thus, a current value and a preceding value lie a specific step size apart and/or they exhibit a specific time interval. In one embodiment the comparison values are symmetrical to a value that is to be currently evaluated. This embodiment is described with reference to a figure in the drawings. Additionally a correction factor comprising each deviation between the duration of a current value and a respective mean value is determined. The rigid coupling of the transducer wheel with the tire and a synchronization between the evaluating algorithm and the angular state of the vehicle wheel results in a fixed allocation between a respective tooth of the transducer wheel and a correction factor. Recurring errors in the system are to be eliminated by means of the respective correction factors. In this respect, reference is made to the content of German Patent DE 197 35 313 A1 for the details of this known process and embodiments.

The object of the present invention is to improve the above described process for monitoring the state of a wheel while improving the reliability and accuracy and to provide a corresponding device.

It is known from the above described process of the prior art that in a process for monitoring the state of a wheel of a motor vehicle, an electrical output signal of a sensor is converted into an essentially rectangular pulse signal. At the same time a respective duration of the pulses is measured; and an especially weighted average between the duration of a current value and a preceding value is determined. In so doing, a current value and a preceding value exhibit a time interval or they are spaced a specific step size apart. A correction factor including each deviation between the duration of a current value and a respective mean value is determined.

In contrast, a process according to the invention is characterized by matching a step size of the correction method to an error order of a fault in order to increase the reliability of the corrected measurement results. In this respect the present invention is based on the recognition that faults can be classified according to orders. In practice the faults usually includes partial faults of different orders, whereas in a base model of the present invention for classifying a fault, a mathematical Fourier analysis of a real physical interference signal is performed. Thus, a maximum cycle duration of systematic faults of a wheel tire is given by the simple circumferential length of the tire and is reproduced by a fixed allocation to the teeth of the pulse transducer wheel. Thus, a fault of first order is described; in reality it is an eccentricity error or an axial offset, without fundamental oscillation. Errors of second or higher order represent the harmonics of this fundamental oscillation. The effect of the adaptation of a step width on a respective fault and/or fault order is explained in detail below with reference to the figures of the drawings.

In a further development a process, according to the invention, exhibits a step size j, which can be determined from a periodic deviation (to be eliminated) of the $m^{th}$ order, according to the following formula:

$$j = 1/m \times n/4.$$

With respect to the number of pulse teeth on a pulse transducer wheel, of size n, a distinction is made between the motor vehicle area with n=48 and an application in motorcycles with n=96 teeth. For the motor vehicle area as a preferred field of application of the invention the specified formula for an embodiment is thus simplified to:

$$j=1/m \times 12.$$

Preferably at least two different step sizes j are applied in combination. The result is, in particular, a correction method as a multi-step process, which is carried out preferably as a series connection of two methods of the invention. For motor vehicles the step sizes j=12 and j=3 are used. The reason for this choice is explained in turn by means of the description of an embodiment and with reference to the figures of the drawings. At this stage the surprising dominance of specific orders of fault and the relatively few means for their elimination shall be discussed in detail here. The same applies to motorcycles, hence, there is no need for a separate discussion here.

In a significant further development of the invention, filtering takes place to reduce the influence of external disturbing stimuli. During each revolution of the wheel, a newly calculated current factor $k_{i-j}$ is filtered with an event-triggered filter according to a $PT_1$ structure in order to obtain, as the result, an improved correction factor $k_i$. In a preferred embodiment of the invention, the filter calculates at an instantaneous revolution N for the respective tooth with index I, a weighted average $k_{N,i}$ between the instantaneous, just calculated factor $k_i$ and the averaged correction factor $k_{N-1,i}$ of the previous revolutions. It carries out the following transfer function:

$$k_{N,i}=(a \times k_{N-1,i}+k_1)/(a+1)$$

In the conversion of a process, according to the invention, the goal is to obtain definitely improved values for determining the rotational speed. Said improved values result in reliable values for determining a reference state, i.e. with respect to its internal pressure. The correction factors, determined for correcting the drifted sensor signals, can be used advantageously together with their fixed allocation to a respective tooth for determining a nonuniformity of a wheel. Building on the described process, the determined correction factors can also be evaluated in order to detect a change in the wheel uniformity and thus, as in the known process for loss of pressure in the tire, to record this change and/or to trigger a warning with or without further intervention. For a detailed description of the process and the definite advantages over the prior art process with respect to accuracy and reliability, reference is made at this point to the drawing and description of an embodiment.

A unit, constructed according to the present invention, can also be adapted in a simple manner to an application in smaller or larger vehicles using varying signal sources or sensors and still maintain the aforementioned advantages. Thus, it can also be adapted especially to motorcycles with a pulse transducer wheel with n=96 teeth. Thus, with the use of an inventive process and a corresponding device, a unit, according to the invention, can be adapted to another area of application. Thus, using the computing capacity of already existing microprocessors of prior art, braking and/or traction control systems, a wheel can be monitored in time slots of approximately 5 ms duration, which have not been used to date in past systems. Owing to a significantly improved evaluation of the speed with plausibility check, one embodiment of the invention enables in particular a more reliable and optimized estimate of the pressure; in addition, a nonuniformity and even a change in the nonuniformity in relation to the wheel can be determined. In processing according to a process of the invention, the speed signal for the wheel slip control systems exhibits a significantly improved quality over the prior art.

Other objects, advantages and novel features of the present invention will become apparent from the following detailed description of the invention when considered in conjunction with the accompanying drawings.

BRIEF DESCRIPTION OF THE DRAWINGS

One embodiment of the invention is described in detail below with reference to the drawings.

FIG. 1 is a drawing in the form of a block diagram;

FIG. 2 depicts a digital filter for calculating the correction factors;

FIG. 4a shows a comparison of an impressed deviation and a deviation, which is determined according to the prior art process and plotted over a wheel circumference with n=48 teeth of a pulse transducer wheel as scaling;

FIG. 4b shows a comparison of an impressed deviation and a deviation determined according to a process of the invention, analogous to the presentation of FIG. 4a;

FIGS. 5a–5d show related drawings of a rotational speed as the raw signal, as the uncorrected raw signal of a sensor, as the result signal using the known process and as the result signal using a multi-step process, according to the invention.

DETAILED DESCRIPTION OF THE DRAWINGS

Figure 3A:
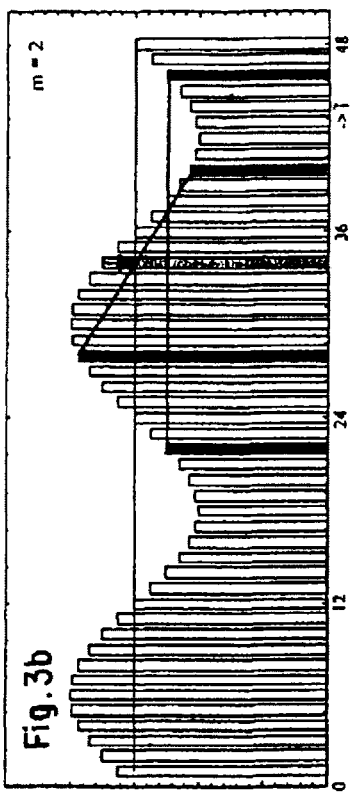
FIGS. 3a–3f show plots of a first harmonic pulse wheel deviation and plots of their higher orders with the effect of a respective correction method with data on the matched step size.
Figure 3C:
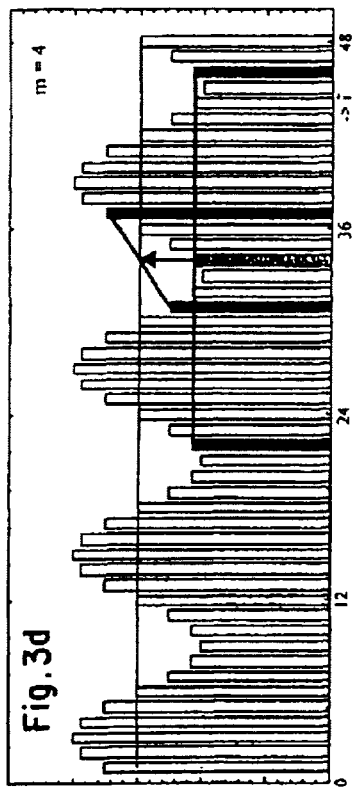
Figure 3E:
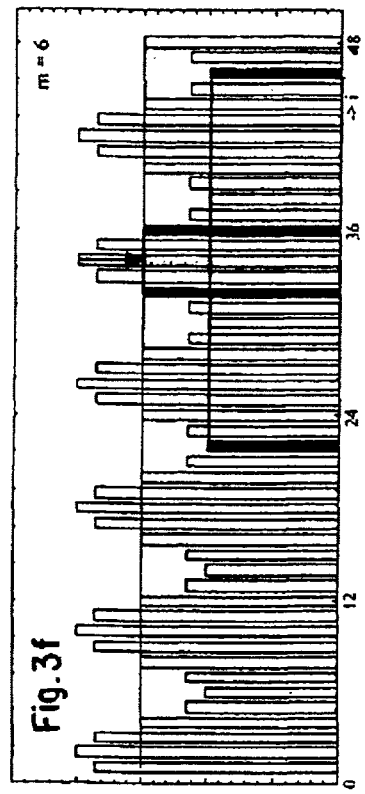
Figure 3B:
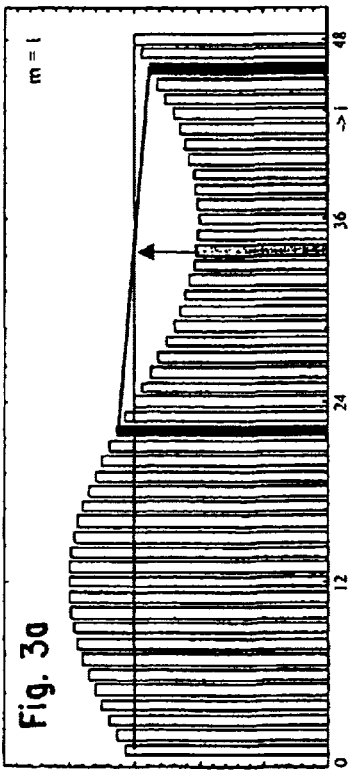
Figure 3D:
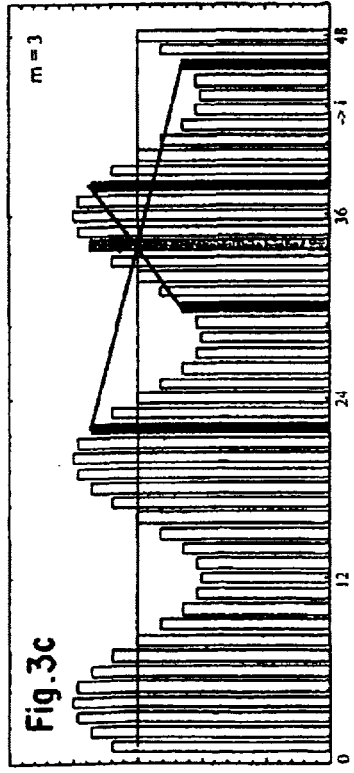
Figure 3F:
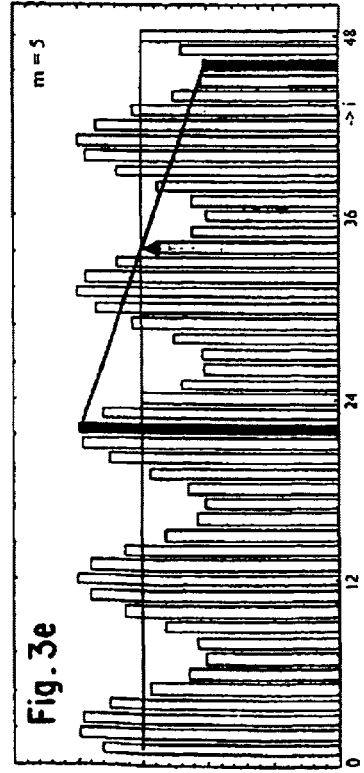

FIG. 1 is a block diagram of a device for converting a process, which is known from German Patent DE 197 35 313 A1 and in which a wheel and a pulse transducer wheel with n=48 teeth are not illustrated for the sake of simplicity. Hence, the device comprises a sensor S with an output signal MS. The sensor S is connected to a signal converter W for the output of a pulse signal 1. Then the pulse signal 1 queues at an input of a unit A ($\epsilon$ i) for finding the error $\epsilon$i per tooth i. On its basis, a respective correction factor k is determined according to the formula $k_i=\epsilon_i+1$, which is, on the one hand, deposited in a storage SP. However, the correction factors $k_i$ serve predominantly to optimally determine a speed v of the wheel. On the basis of the most reliable and accurate knowledge possible of the speed v, a conclusion is drawn about the pressure p in the interior of the tire, because a pressure drop induces a decrease in the diameter and thus an increasing rotational speed and a shift in the characteristic chassis frequencies. On the other hand, the correction factors $k_i$ are permanently assigned to a respective tooth i of the pulse transducer wheel so that, for example, a stone in the profile of the wheel tread can be recognized and removed within the framework of workshop maintenance. In addition, on the basis of the stored long term data, conclusions can be drawn about the tire defects or weak spots.

The present invention now uses the knowledge that a tire exhibits different types of faults, which can be indicated as faults of different orders in a Fourier analysis of the measurement signal MS of the sensor S. The following process, which is described in detail below, is based on this knowledge:

In a driving operation that is representative of actual service, the design with a step size j=12, a quarter circle step over the circumference of the pulse transducer wheel has proven in the past to be the optimal layout for motor vehicles, as described in detail in German Patent DE 197 35 313 A1, to whose content explicit reference is made here. In checking the plausibility, during which process a single tooth of the pulse wheel is intentionally deformed and thus an additional primary deviation is impressed, it has turned out, however, that in specific cases a one step correction method with the step size j=12 is not sufficient. To be sure, this single deviation in the overall picture of the correction factors is found again at the correct place (see arrow P1 in FIG. 4a) and in the correct magnitude. At the opposite place, shifted a half revolution of the wheel, a correction value of similar magnitude is produced, but with the opposite sign; see arrow P2 in FIG. 4b. The result is a reflection of the single deviation at a point at which there are no such errors. To detect also these cases, the correction method is designed, as a function of the type and design of the wheel speed measurement, as a multi-stepped method with different interpolation intervals, as described and illustrated in detail below.

The systematic deviations of the wheel speed measurement will not exhibit a pure sine shape. Therefore, the correction method that is tuned to a sinusoidal deviation will not be able to detect the entire spectrum of possible deviations. In addition, the duodecimal correction method amplifies in principle the fourth harmonic. Since, according to Fourier, each time limited or time expanded, but periodic function can be developed by a series of sine and cosine terms, an overview of the possible deviations of the first and higher order will be given first. FIGS. 3a–3f show plots of a first harmonic pulse wheel deviation and plots of their higher orders with the effect of a respective correction method with data on the matched step size. It is evident that a deviation of first order can be corrected the best with a step size j=12; see FIG. 3a. The counts of the counter are shown for one revolution, together in one figure with their mean value. The deviations have to be corrected with respect to the mean count; and the arrow shows the direction of the effect of the correction. For this reason different deviations in the counts of the counters need, as a function of the deviation, different step sizes of the correction method.

As the figures of FIGS. 3a, c and e show, the correction method with a step size j=12 can in theory eliminate deviations of odd order. As an example, the effect is explained by means of an arbitrary count i=34. In the case of a deviation of odd order, the correction is always with respect to the mean count. See the line in the FIGS. 3a, c and e. The straight line crosses the mean speed at the point of the count to be corrected; in this case: index i=34. Size and direction of the drawn arrows show in which direction and to what value the correction is made. In summary, a correction method with step size j=12 can theoretically correct all periodic deviations of odd order.

However, deviations of even order cannot be eliminated with this step size. Since in deviations of even order the mean value is formed between two counts of equal size, the correction method leaves a residual deviation of even order. See the line in FIGS. 3b, d and f. Another problem is that in the case of individual deviations the fourth order can be artificially amplified, because the chain of effects of the correction method fits, on the one hand, too short and, on the other hand, integrally in the total number of the pulse teeth. The count with index i=34 is not at the mean speed; there remains a difference that clearly renders it difficult to evaluate the signal frequencies. Halving the step size to j=6 shows none the less that in this manner deviations of second order can be eliminated. See the line in FIG. 3b. A further reduction of the step size to j=3 allows deviations of the fourth order to disappear. See the line in FIG. 3d. Finally deviations of the sixth order with a step size j=2 can be reduced. See the line in FIG. 3f. In summary, periodic deviations of the even $m^{th}$ order at n=48 teeth with a step size j can be corrected according to the following equation:

$$j=1/m \times 12$$

A correction method with step size j, according to the above formula, can eliminate a periodic deviation of the $m^{th}$ even order. This equation applies even to deviations of the first and third order. See FIGS. 3a and c. In consideration of non-integral step sizes (this would mean a weighted averaging between two supporting counts), a deviation of the fifth order can be corrected by approximation. A consideration of even higher frequencies does not seem to be logical at this time, so that the specified formula for the fault orders considered here is generally used.

With a step size j=1 the individual deviations are not yet optimally corrected. An individual deviation needs for its correction a step size that is greater than j=1. In a preferred embodiment the correction method is designed as a multi-step process with a series connection of the step sizes j=12 and j=3. The reason for the choice of the step size j=3 is that with the step size j=12 it is not possible to sufficiently eliminate deviations of the fourth order. However, with a step size j=3 both periodic deviations of the fourth order and also individual deviations can be corrected.

FIG. 4a shows a comparison of an impressed deviation and the deviation, which is measured according to the process known from German Patent DE 197 35 313 A1 and plotted over a wheel circumference with n=48 teeth of a pulse transducer wheel as scaling. In an actual driving operation the following components are measured in a sensor signal: $\Omega_G$ the constant content, i.e. the actual driving speed $\Omega_N$ the useful signal, i.e. the high frequency chassis vibrations $\Omega_s$ the measurement noises, which do not represent any systematic deviations The change in the actual driving speed owing to braking and acceleration is very low frequency in relation to the high frequency chassis vibrations and is reflected in the constant content for the sake of simplicity. Thus, the rotational speed, which is measured by the virtual measurement technique, is represented with the following summation:

$$\Omega_{wheel} = \Omega_G + \Omega_N + \Omega_S.$$

The unit of the rotational speed is shown in rev/s (rev/sec). The instantaneous current calculation of the rotational speed is done by means of a very much faster rate than the frequency of the influences to be analyzed. Finally a simulation model of the wheel speed measurement is prepared. The Count can be reconstructed with the following formula:

$$\tau_i = (1/[\Omega_{wheel} \times n]) \times f_{counter}$$

In the above formula, n is the number of teeth at the pulse wheel; $f_{counter}$ is the counter frequency. At constant driving speed, counts of approximately equal size are produced. In this respect it is important that the synchronization between the gearwheel and index is maintained. After the counts have been calculated on the basis of the aforementioned contents in the rotational speed, the systematic deviations of the pulse wheel are impressed.

It has been demonstrated in driving tests that the nonuniformity of the pulse wheel used in the test carrier comprises predominantly a combined deviation of the first and fourth order. To test the effect on the individual deviations, an additional positive individual deviation for the tooth with index 25 was impressed next to each other with two smaller ones on both sides. The pure driving speed is 150 km/h or $\Omega_G$=20.8 rev/s; and the above equation yields at a count frequency of approximately 1 MHz counts of about 1,000 units.

The solid line in FIGS. 4a and 4b shows the total deviation of the pulse wheel in percents, where FIG. 4b, analogous to the drawing in FIG. 4a, shows a comparison of the impressed deviation and the deviation, measured according to the process of the invention. After a suitable transient time, which amounted to approximately 5 seconds for both simulation variants, the result of the one step correction method, according to FIG. 4a with j=12, and the series connected two step correction method of FIG. 4b with j=12 and j=3, is shown directly under the first result. Differences between the impressed and measured deviation can be clearly illustrated in this manner. The top figure shows clearly that the one step correction method is suitable primarily for filtering out deviations of the first order. The individual deviation is measured at the correct place $P_1$; unfortunately every quarter wheel revolution away from there, the correction factors occur at places $P_2$, at which there are no such errors. See the solid line for the impressed deviation. The deviation of fourth order is invisible for the one step correction method due to the concept. In contrast, the combined correction method with the series connected step sizes j=12 and j=3 adapts itself precisely to the impressed deviations. The systematic errors are measured at the correct places and in the correct sizes. See FIG. 4b in comparison to FIG. 4a.

Since the correction method requires initially some revolutions to fill the register and to learn the correction factors, the result of the correction method may not be used again until after about 4 seconds. To illustrate the effect of the correction method, the first five seconds are shown. See FIGS. 5a–d with related drawings of a rotational speed as the physical raw signal, as the uncorrected raw signal of a sensor, as the result signal using the aforementioned method and as result signal using a multi-step process according to the invention.

The signal of the rotational speed $\Omega$=20.85 rev/s also contains, as the useful signal a 12 Hz vibration with an amplitude of 0.02 rev/s and as the interference signal, a normally distributed "white" noise with a standard deviation of 0.01 rev/s. See FIG. 5a. On account of the deviations of the first and fourth order, shown in FIG. 4a, and an individual deviation, the influence of the systematic errors is chosen intentionally larger than the useful signal. The rotational speed signal is falsified in such a manner by the measurement that a reasonable evaluation of the useful signal is impossible. See FIG. 5b. Without the correction method, the characteristic frequencies of the chassis cannot be derived from the rotational speed signal under all circumstances. The one step correction method with a step size j=12 yields already a significantly improved result, but there are still residual influences of the impressed deviations, which have a significant negative impact on the evaluation of the frequency. See FIG. 5c. The rotational frequency of first order can be almost completely smoothed with a one step correction method. However, disturbing influences of higher orders remain. An evaluation in the area of the torsion vibration of the tire is predominantly impeded, if not impossible. Finally the two step correction method yields the required signal quality. See figure of FIGS. 5d. After 4 seconds there is already, as the output signal of the correction method, a clean rotational speed signal with a clearly accentuated useful content of the impressed 12 Hz sine signal. Due to the averaging over all counts, measured within one computing cycle, in this case 5 every 5 ms, the influence of the noise is also suppressed. This result provides a better evaluation than the original physical raw signal, according to FIG. 5a.

Because of the digitizing of the measurement environment and because the rotational speed is not at all constant, a clean separation between, on the one hand, the rotational frequency of the wheel, and thus the first base frequency of the disturbing deviations, and, on the other hand, a characteristic chassis frequency is possible, even when both frequencies lie very close side by side. With the already calculated correction factors the newly arrived counts are corrected and averaged to form a rotational speed value. In addition, the design of a $PT_1$ filtering of the correction factors $k_1$, according to FIG. 2, is chosen in such a manner that the same frequencies of both contents have an insignificant effect on the correction factors for a short period of time. Thus, the ability of the correction method to separate disturbing systematic deviations cleanly from the useful signal is guaranteed.

FIG. 2 shows a digital filter for calculating correction factors. To prevent the stochastic road stimulus from having an effect on the calculation of the correction factors, the current factor $k_{1-j}$, which is calculated anew in each revolution, is filtered, according to FIG. 2, with an event-triggered filter having a $PT_1$ structure. Without this long-term smoothing of the correction factor, a road-excited vibration would otherwise be interpreted in the signal of the wheel speed as a systematic deviation of the pulse wheel and would be filtered out of the desired useful signal. The filter calculates for the respective tooth with index i a weighted average $k_{N,1}$ between the instantaneous, just calculated factor $k_j$ and the averaged correction factor $k_{N-1,i}$ of the previous revolutions, according to the following formula:

$$k_{N,i} = (a \times k_{N-ij} \times k_i)/(a+1)$$

The n=48 factors $k_i$ are calculated anew every revolution N, according to this equation. As input for the filter, the value $k_i$ is used. The factor a determines the time constant of the filter and indicates the percentage of the just calculated factor $k_i$ in the correction factor $k_{N,I}$ that is used for the final correction of the measured count. The filtering converges to the individual deviation of the pulse wheel; thus it is stable. During the runtime of the process, the factor a is matched in consideration of the previously derived stability requirement. Initially a small value a provides for the fast response to the correct k value. After some time the factor a is increased. Thus, short term influences from faults or the like are of less consequence and thus do not enter instantaneously so significantly into the correction factors. In this manner the resolution and accuracy of the characteristic frequency calculation are increased. The larger a is, the slower is the time constant of the discrete filter.

In the improved method an important starting point in measuring the counts is that the order of sequence of the chronological arrival of the counts is maintained, and the synchronization between the evaluation algorithm and the current angular state of the wheel is kept so that the result is a fixed allocation between a respective tooth i and a correction factor $k_j$.

Thus, a significant improvement in the accuracy and reliability in determining the speed v of the wheel is achieved so that dangers due to an unnoticed pressure drop in a tire can be minimized by early and reliable recognition of a loss of pressure.

Wherever there are parts that rotate about an axis, there is also the problem of nonuniformity. This means that the result is undesired and uncontrolled forces that interfere with the true running and that promote wear. Said forces have a destructive effect and can have a negative impact on the safety. An imbalance is a special form of wheel nonuniformity that is the periodic nonuniformity of first order. In principle one distinguishes two types of imbalance: the static and the dynamic imbalance. One speaks about a static imbalance when there is a nonuniform distribution of mass in relation to the wheel's axis of rotation. The static imbalance shifts the center of mass away from the axis of rotation in the direction of the place of imbalance and causes a constant rebound and deflection of the wheel as a function of the frequency of rotation. A dynamic imbalance can also be due to a nonuniform distribution of the mass, but with respect to the center plane, which is vertical to the axis of rotation and which goes through the wheel's center of mass. A dynamic imbalance is inclined during rotation to increasingly stronger tilt and tumble motions as the speed increases. An external sign is a conspicuous flapping of the steering wheel, which in itself is already a distinct reduction in driving comfort. Not only an asymmetrical distribution of mass results in a nonuniformity, but also unsteadiness in the radial spring stiffness, eccentricities in the bearing, manufacturing tolerances, installation errors and external influences in the driving operation affect the irregularity.

Subjectively imbalances are easy to perceive; however, the cost of the equipment to detect even small imbalances is significantly higher. The above proposed multi-step correction method yields not only a rotational speed signal v, which is protected from disturbing influences, but also valuable information about the systematic deviations of the wheel and thus also about the nonuniformity. In the above process for detecting a loss of pressure in the tire, the systematic errors in measuring the speed are eliminated. Each tooth of the pulse wheel is allocated its deviation with respect to the desired value. The systematic deviations are measured; the correction factors are available in sufficiently fine gradations per wheel n=48.

List of Reference Characters n number of teeth per pulse wheel, for motor vehicle n=48 (motorcycle n=96)
i consecutive index over the teeth of the pulse wheel
$\epsilon_i$ error, assigned to a tooth
$k_i$ correction factor $k_i=\epsilon_i+1$
$k_I$ current correction factor that is calculated anew per revolution
$t_i$ current pulse count
$t_{I+i}$ supporting points
j step size of a correction method
m error order
$\Omega$ speed
N revolution of the wheel
a time constant of the event-controlled filter
S sensor
MS output signal/measurement signal
W converter
l pulse signal
$A(\epsilon_i)$ conditioning unit for errors $\epsilon_i$ per tooth i
p tire pressure
v speed
SP storage The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for monitoring the state of a wheel of a motor vehicle, comprising the steps of:
   converting an output signal (MS) generated by a sensor (S) into an essentially rectangular pulse signal (l);
   measuring a respective duration of the pulses;
   determining a particular weighted average between a current duration value of a current pulse and a preceding duration value of a preceding pulse, wherein the current pulse and the preceding pulse lie a specific step size apart, wherein the specific step size is the number of consecutive pulses from the current pulse to the preceding pulse; and
   determining a correction factor ($k_i$) from each deviation between the current duration value and the particular weighted average;
   wherein said step size (j) is correlated with an error order (m) of a fault and wherein the step size (j) with a periodic deviation of the $m^{th}$ order (m) that is to be eliminated is determined according to the formula j=1/m×n/4 for motor vehicles.

2. The process according to claim 1, further comprising determining the particular weighted average using at least two different step sizes (j) and (j1).

3. The process according to claim 1, wherein the correction method is carried out as a multi-step process with a series connection of the two different step sizes j=12 and j1=3 at n=48 teeth.

4. The process according to claim 1 including the step of filtering to minimize the influence of external disturbing stimuli.

5. The process according to claim 1, wherein a newly calculated current factor ($k_{i-j}$) is filtered with an event-triggered filter according to a $PT_1$ structure.

6. The process according to claim 1, wherein a current factor ($k_{1-j}$) is calculated anew in each revolution (N) of a wheel.

7. The process according to claim 5, wherein the filter carries out the following transition function:

$$k_{N,i}=(a \times j_{N-1,i}+k_1)/(a+1).$$

8. The process according to claim 1, wherein n=48.

9. A device for monitoring the state of a wheel of a motor vehicle, said device comprising
   a sensor (S), providing a first output signal to a signal converter (W) which outputs a pulse signal; and
   a downstream unit ($A(\epsilon_i)$, v, p) receiving said pulse signal for determining and evaluating correction factors ($k_1$), in order to measure a respective duration of the pulse signal and determining a particular weighted average between a current duration value of a current pulse and a preceding duration value of a preceding pulse to provide a specific step size and determining a connection factor (ki) from each deviation between the current duration value and the particular weighted average wherein said step size is correlated to an error order (m) of a fault wherein the step size (j) with a periodic deviation of the $m^{th}$ order (m) that is to be eliminated is determined according to the formula j=1/m×n/4; for motor vehicles.

10. The device according to claim 9, wherein at least two different step sizes (j) and (j1) are used in combination.

11. The device according to claim 9, wherein the correction method is carried out as a multi-step process with a series connection of the two different step sizes j=12 and j1=3 at n=48 teeth.

12. The device according to claim 9, wherein an influence of external disturbing stimuli is minimized by filtering.

13. The device according to claim 9, wherein a newly calculated current factor ($k_{i-j}$) is filtered with an event-triggered filter according to a $PT_1$ structure.

14. The device according to claim 9, wherein a current factor ($k_{1-j}$) is calculated anew in each revolution (N) of a wheel.

15. The device according to claim 13, wherein the filter carries out the following transition function:

$$k_{N,i} = [a \times j_{N-1,j} + k_1]/(a+1).$$

16. The device according to claim 9, wherein n=485.

* * * * *